(12) United States Patent
Kim et al.

(10) Patent No.: US 7,656,829 B2
(45) Date of Patent: Feb. 2, 2010

(54) SYSTEM AND METHOD FOR DETERMINING DATA TRANSMISSION PATH IN COMMUNICATION SYSTEM CONSISTING OF NODES

(75) Inventors: Dae-young Kim, Daejeon (KR); Sang-su Lee, Jinju-si (KR); No-sung Park, Seoul (KR); Ji-tae Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 766 days.

(21) Appl. No.: 11/023,347

(22) Filed: Dec. 29, 2004

(65) Prior Publication Data

US 2005/0159111 A1 Jul. 21, 2005

(30) Foreign Application Priority Data

Jan. 6, 2004 (KR) ...................... 10-2004-0000565

(51) Int. Cl.
*H04B 7/00* (2006.01)
*H04L 12/28* (2006.01)
*G06F 1/32* (2006.01)

(52) U.S. Cl. .................. 370/310; 370/241; 370/313; 370/315; 370/318; 370/401; 455/7; 455/11.1; 455/445; 455/522; 455/575; 713/320; 713/321; 713/323; 713/324

(58) Field of Classification Search ......... 370/229–401; 455/13.4, 522, 574, 127.5, 343.5, 445, 70, 455/69, 7, 11.1; 713/320–324
See application file for complete search history.

(56) References Cited

U.S. PATENT DOCUMENTS 6,085,349 A * 7/2000 Stein .......................... 714/778
6,097,703 A * 8/2000 Larsen et al. ................ 370/254
6,374,311 B1 * 4/2002 Mahany et al. ................ 710/18
6,735,448 B1 * 5/2004 Krishnamurthy et al. .... 455/522
6,735,630 B1 * 5/2004 Gelvin et al. ................ 709/224
6,895,450 B2 * 5/2005 Mahany et al. ................ 710/18

(Continued)

FOREIGN PATENT DOCUMENTS

JP 2000-307595 A 11/2000

(Continued)

OTHER PUBLICATIONS

Jong-Mu Choi, et al., "A Power Saving Routing Scheme in Wireless Networks", Apr. 2003, pp. 179-188, Abstract.

(Continued)

*Primary Examiner*—Ayaz R Sheikh
*Assistant Examiner*—Venkatesh Haliyur
(74) *Attorney, Agent, or Firm*—Sughrue Mion, PLLC (57) ABSTRACT

In a communicating system including a base node, at least one adjacent node, and a start node transmitting data requested by the base node via the adjacent node or to the base node, data requested to the start node is transmitted by measuring a power required for data transmission between the nodes forming the communication system, selecting a path one by one depending on a minimum power consumption required for the data transmission from the base node to the start node using the measured power, and transmitting the requested data using the selected path.

15 Claims, 9 Drawing Sheets

U.S. PATENT DOCUMENTS

| | | | |
|---|---|---|---|
| 6,904,110 B2 * | 6/2005 | Trans et al. | 375/350 |
| 6,965,568 B1 * | 11/2005 | Larsen | 370/238 |
| 7,248,841 B2 * | 7/2007 | Agee et al. | 455/101 |
| 7,328,049 B2 * | 2/2008 | Chanut | 455/574 |
| 7,552,246 B2 * | 6/2009 | Mahany et al. | 710/18 |
| 2003/0033394 A1 * | 2/2003 | Stine | 709/222 |
| 2003/0086515 A1 * | 5/2003 | Trans et al. | 375/346 |
| 2004/0103218 A1 * | 5/2004 | Blumrich et al. | 709/249 |
| 2004/0106423 A1 * | 6/2004 | McGowan et al. | 455/522 |
| 2004/0266339 A1 * | 12/2004 | Larsson | 455/7 |
| 2005/0014464 A1 * | 1/2005 | Larsson | 455/11.1 |
| 2006/0007863 A1 * | 1/2006 | Naghian | 370/238 |
| 2007/0258508 A1 * | 11/2007 | Werb et al. | 375/140 |
| 2008/0037431 A1 * | 2/2008 | Werb et al. | 370/241 |
| 2008/0037454 A1 * | 2/2008 | Werb et al. | 370/310 |
| 2008/0132264 A1 * | 6/2008 | Krishnamurthy et al. | 455/522 |

FOREIGN PATENT DOCUMENTS

| | | |
|---|---|---|
| JP | 2001-128231 A | 5/2001 |
| KR | 10-2004-0097597 A | 11/2004 |
| WO | 03/061175 A2 | 7/2003 |
| WO | 03/101132 A1 | 12/2003 |

OTHER PUBLICATIONS

S. Takeuchi, et al.: "A Proposal of Battery Cost Routing in Consideration of Transmission Power"; The Institute of Electronics Information and Communication Engineers; Technical Report of IEICE; (Mar. 2002); pp. 127-134.

* cited by examiner

SYSTEM AND METHOD FOR DETERMINING DATA TRANSMISSION PATH IN COMMUNICATION SYSTEM CONSISTING OF NODES

CROSS-REFERENCE TO RELATED APPLICATIONS

This application claims priority from Korean Patent Application No. 2004-00565 filed on Jan. 6, 2004 in the Korean Intellectual Property Office, the disclosure of which is incorporated herein by reference in its entirety.

BACKGROUND OF THE INVENTION

1. Field of the Invention

The present invention generally relates to an ad-hoc sensor network. More specifically, the present invention relates to a system and a method enabling nodes forming an ad-hoc sensor network to transmit data using a minimum power.

2. Description of the Related Art

Figure 1:
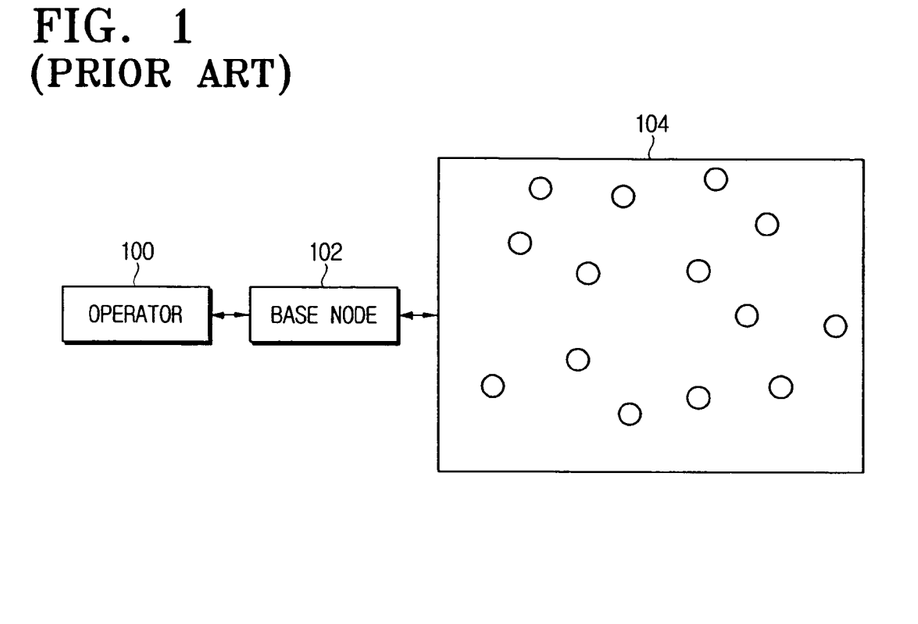
FIG. 1 is a schematic block diagram illustrating an ad-hoc sensor network.

In a general communication system, data is transmitted and received between a mobile element and a base station. The mobile element and the base station directly transmit and receive data without having to pass through other nodes. In contrast, when data of a certain node is transmitted to a base node in an ad-hoc sensor network, other nodes are not available. Referring to FIG. 1, the configuration of the ad-hoc sensor network is described below. The ad-hoc sensor network consists of an operator 100, a base node 102, and a plurality of nodes as shown in FIG. 1.

The operator 100 requests the base node 102 to collect necessary data. The data requested by the operator 100 relates to information on temperature of the environment around a sensor field 104. The base node 102 requests the requested data to each node located in the sensor field 104, and forwards the data received from each node to the operator 100. Each node collects the data requested by the base node 102, and transmits the collected data to the base node 102. Nodes located within a certain distance from the base node 102 transmit the collected data directly to the base node 102. Other nodes located outside of the certain distance from the base node 102 transmit the collected data to the base node 102 via neighbor nodes of the base node 102, not directly to the base node 102, so as to minimize the power consumed for the data transmission. The distance from the base node 102 to a node is directly proportional to the power consumed by the node to transmit data. Accordingly, the nodes out of the certain distance from the base node 102 transmit the collected data via a plurality of other nodes so as to reduce the power consumption for the data transmission. Hereinbelow, a node relaying data of another node refers to a relay node. The relay node traits its collected data directly to the base node 102 or via other relay nodes.

Figure 2:
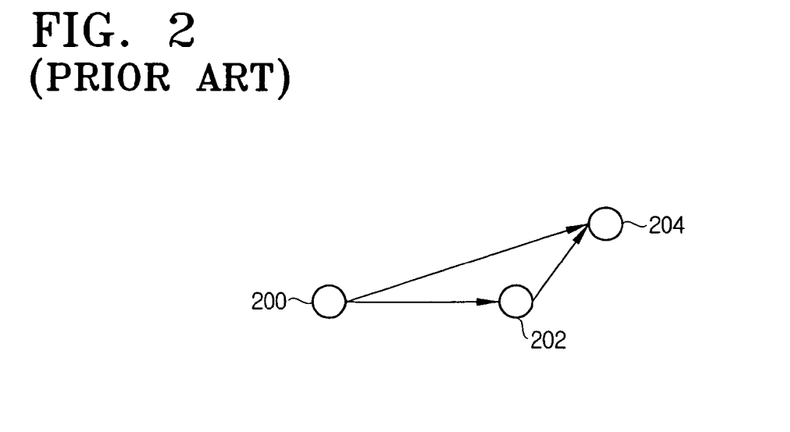
FIG. 2 is a diagram illustrating the relay node determination in the ad-hoc sensor network.

FIG. 2 illustrates a node determining a relay node for transmitting the collected data to the base node. The node transmitting the collected data refers to a start node 200. The start node 200 transmits the collected data to the base node via relay nodes. It is assumed that the node 204 is a relay node which relays the collected data of the start node 200 to the base node.

The start node 200 determines whether to use the node 202 as a relay node or not. Specifically, the start node 200 needs to determine whether to use both of the nodes 202 and 204 or to use the node 204 alone, to transmit the collected data to the base node. The start node 200 determines the relay node based on the power consumption for the data transmission of each node 202 and 204. In general, the power consumed for the data transmission is directly proportional to the square of the distance between nodes transmitting and receiving data with each other.

Provided that the power consumed to transmit data from a node A to a node B is $\Gamma(A, B)$, the power consumed to transmit the collected data from the start node 200 to the node 204 is $\Gamma(200,204)$ and the power consumed to transmit the collected data from the start node 200 to the node 204 via the node 202 is $\Gamma(200,202)+\Gamma(202,204)$. The start node 200 compares $\Gamma(200,204)$ with $\Gamma(200,202)+\Gamma(202,204)$ and determines whether to use the node 202 as the relay node.

Figure 3:
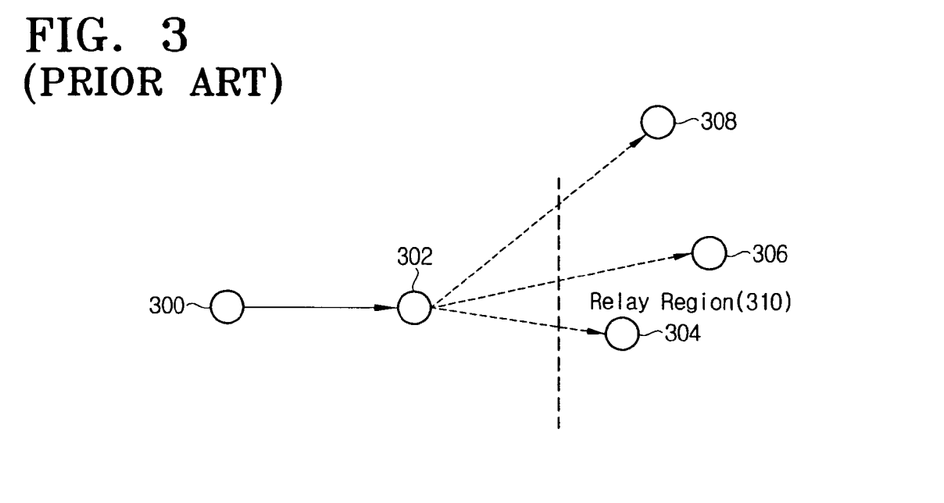
FIG. 3 is another diagram illustrating the relay node determination in the ad-hoc sensor network.

FIG. 3 illustrates another example of the start node determining the relay node. The start node 300 pre-stores the case when a certain node can be used as the relay node. If the node 302 can be the relay node, the start node 300 transmits its collected data to the nodes 304 and 306 located in the relay region 310, via the node 302.

Each node 300 to 308 is initially set to identify locations of itself and neighbor nodes. That is, each node can identify the location of the nodes capable of transmitting the data not via the other nodes. Hence, the start node 300 uses the node 302 as the relay node only when the start node 300 transmits data to the nodes 304 and 306 in the relay region 310. If the node 308, which the data is destined for, is out of the relay region 310, the start node 300 does not use the node 302 as the relay node.

As described above, the conventional routing method, that is, the method for determining the data transmission path, considers only the distance between the nodes. The distance is calculated using the location information of each node, and the power consumption for the data transmission is calculated using the acquired distance. The path having minimum power consumption is determined based on the calculated power consumption. However, it is disadvantageous to measure the power consumption based on the distance alone. For example, even if the distance is short, significantly more power may be consumed for the data transmission due to environmental factors.

SUMMARY OF THE INVENTION

To address the above problems and disadvantages of the conventional arrangement, an exemplary aspect of the present invention is to provide a routing system and method having minimum power consumption for data transmission.

Another exemplary aspect of the present invention is to provide a system and method using a difference path depending on data importance.

Still another exemplary aspect of the present invention is to provide a system and method capable of minimizing a difference of a power consumption of nodes located in a sensor field.

Yet another exemplary aspect of the present invention is to provide a routing system and method considering a temporarily idle node and a permanently idle node.

Yet another exemplary aspect of the present invention is to provide a routing system and method considering a node having mobility.

To accomplish the above exemplary aspects and features of the present invention, there is provided a method for transmitting data requested to a start node in a communicating system comprising a base node, at least one adjacent node, and the start node transmitting data requested by the base node via the adjacent node or to the base node. The method comprises the steps of measuring a power required for data transmission between the nodes forming the communication system, selecting a path one by one depending on a minimum power consumption required for the data transmission from the base node to the start node using the measured power, and transmitting the requested data using the selected path.

Consistent with the above exemplary aspects of the present invention, in a communication system comprising a base node, at least one adjacent node, a start node transmitting data requested by the base node via the adjacent node or to the base node, a system for transmitting data requested to the start node comprises the base node and the start node selecting a path one by one depending on a minimum power consumption required for the data transmission from the base node using a measured power consumption of each node, and transmitting the requested data using the selected path.

BRIEF DESCRIPTION OF THE DRAWING FIGURES

These and/or other exemplary aspects and advantages of the invention will become apparent and more readily appreciated from the following description of the exemplary embodiments, taken in conjunction with the accompanying drawing figures in which.

DETAILED DESCRIPTION OF EXEMPLARY EMBODIMENTS

Reference will now be made in detail to the exemplary embodiments of the present invention, examples of which are illustrated in the accompanying drawing figures, wherein like reference numerals refer to the like elements throughout. The exemplary embodiments are described below in order to explain the present invention by referring to the drawing figures.

A routing method according to an exemplary embodiment of the present invention considers a power consumption in substantial data transmission as well as a distance between nodes, as compared with the conventional method.

Figure 4:
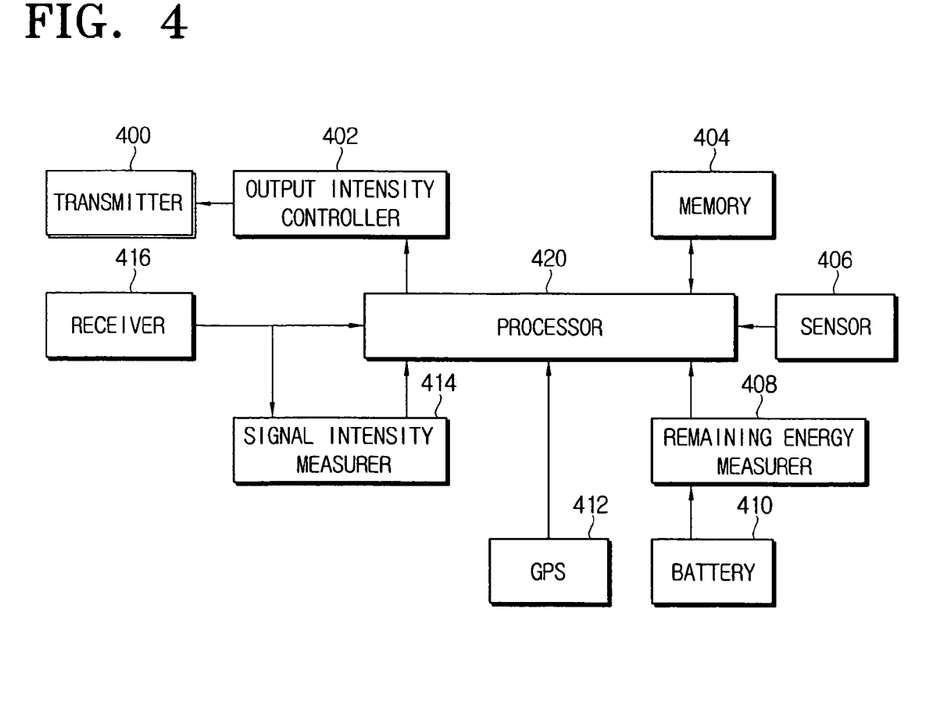
FIG. 4 is a block diagram illustrating a node according to an exemplary embodiment of the present invention.

FIG. 4 illustrates a construction of a node according to an exemplary embodiment of the present invention. The node includes a transmitter 400, an output intensity controller 402, a receiver 416, a memory 404, a processor 420, a signal intensity measurer 414, a sensor 406, a remaining energy measurer 408, a battery 410, and a global positioning system (GPS) 412. Although the node may include other elements, only the requisites are illustrated in FIG. 4 for ease of understanding and not for limitation. The transmitter 400 transmits collected data or data received from a start node or a relay node. The output intensity controller 402 controls the output intensity of the transmitted data. In more detail, the output intensity controller 402 increases the output intensity when data transmission between the node and another node requires more power, and decreases the output intensity when data transmission between the node and another node requires less power.

The sensor 406 collects necessary data depending on a command of a base node. The memory 404 temporarily stores the collected data or the received data. The signal intensity measurer 414 measures signal intensity of a received signal. The measured signal intensity is used to acquire the power consumption of nodes in transmitting the signal. The remaining energy measurer 408 measures a remaining energy left in the battery 410. The GPS 412 pinpoints the location of the node. The processor 420 controls operations of the elements or performs other required operations.

Figure 5:
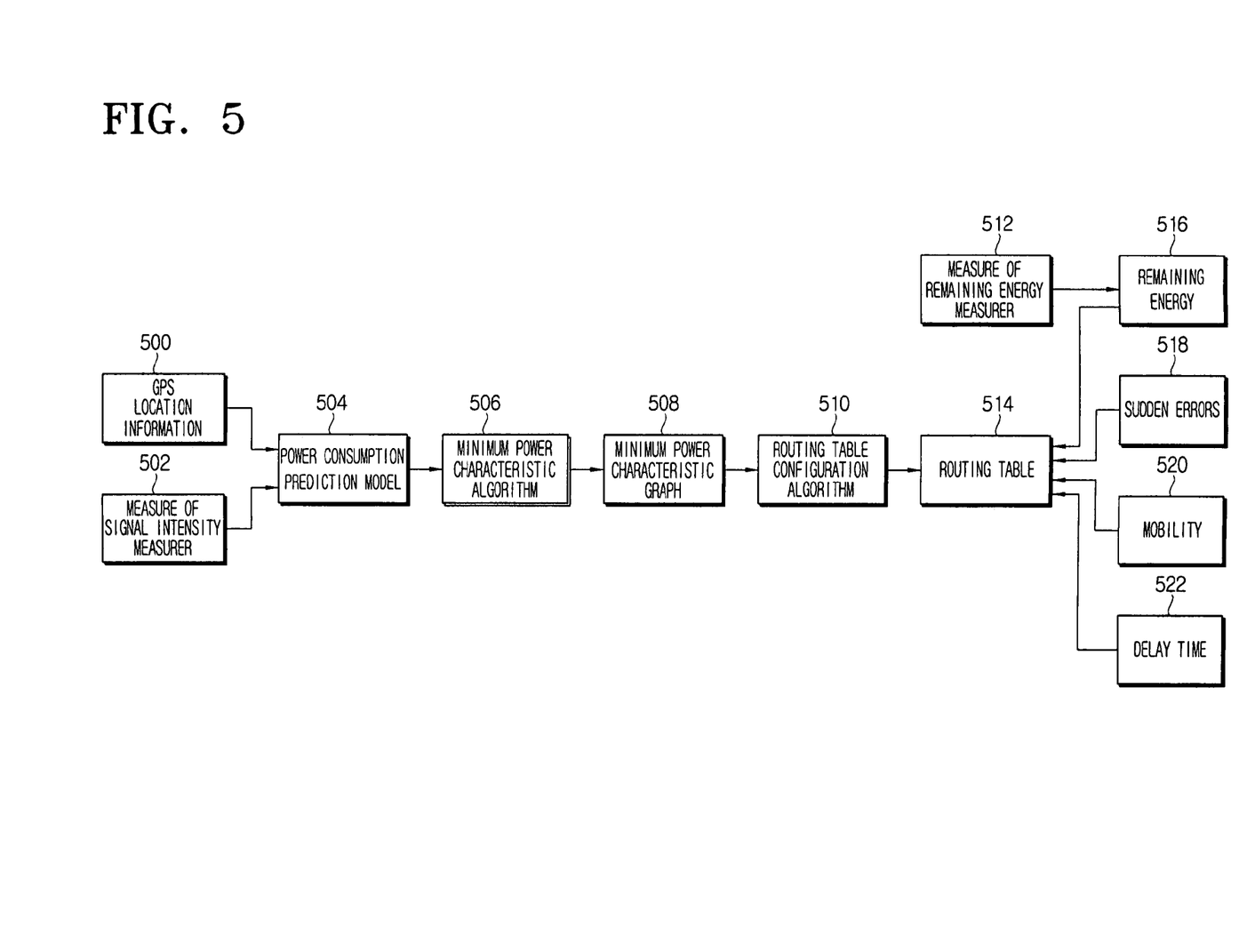
FIG. 5 is a schematic diagram illustrating operations of the node according to an exemplary embodiment of the present invention.

FIG. 5 illustrates exemplary routing steps according to an exemplary embodiment of the present invention. A node predicts power consumptions between nodes using a power consumption prediction model 504 based on a location information 500 provided from the GPS 412 and the measure 502 provided from the signal intensity measurer 414. A minimum power characteristic graph 508 is configured using the predicted power consumption 504 and a minimum power characteristic algorithm 506. A routing table 514 is generated using the minimum power characteristic graph 508 and a routing table configuration algorithm 510. In this exemplary embodiment, the generation of the routing table 514 considers the remaining energy 516 measured by the remaining energy measurer, sudden errors 518 of the node, mobility 520 of the node, and a delay time 522 of data transmission. Hereinbelow, the routing steps are described in more detail.

Figure 6:
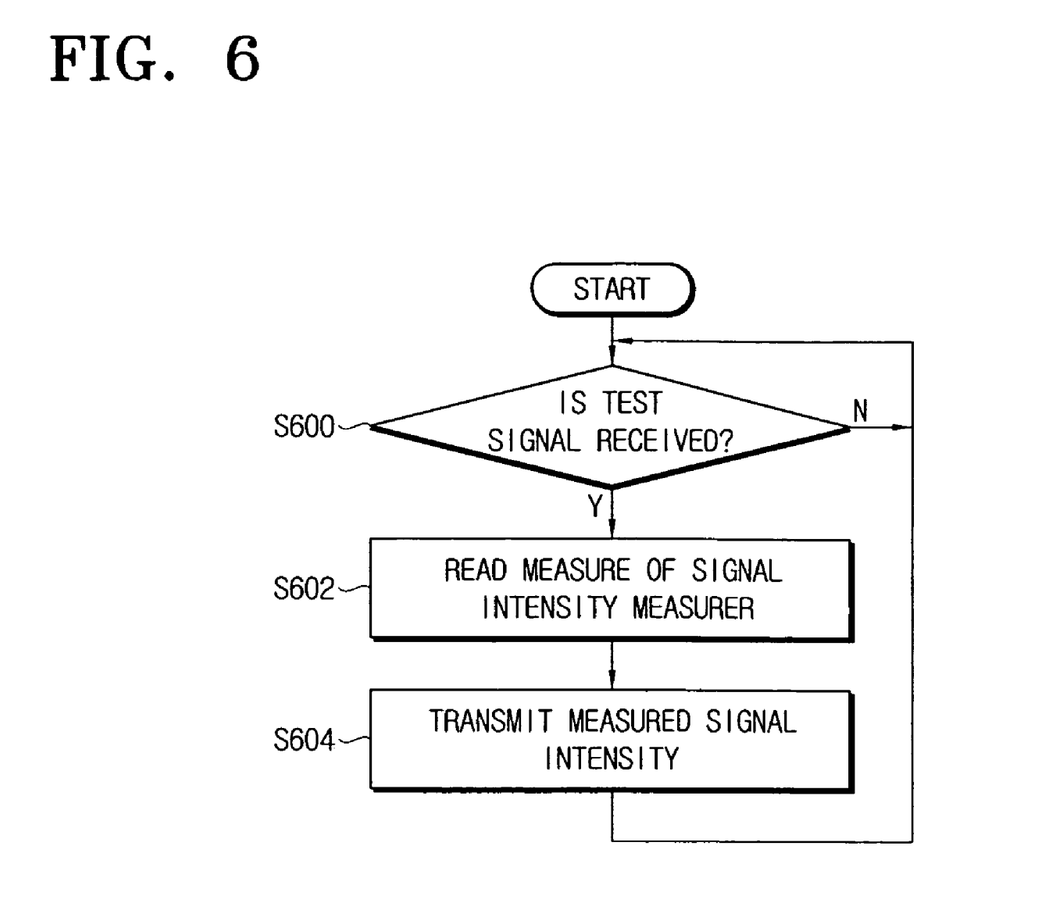
FIG. 6 is a flowchart illustrating exemplary steps of a node receiving a test signal.
Figure 7:
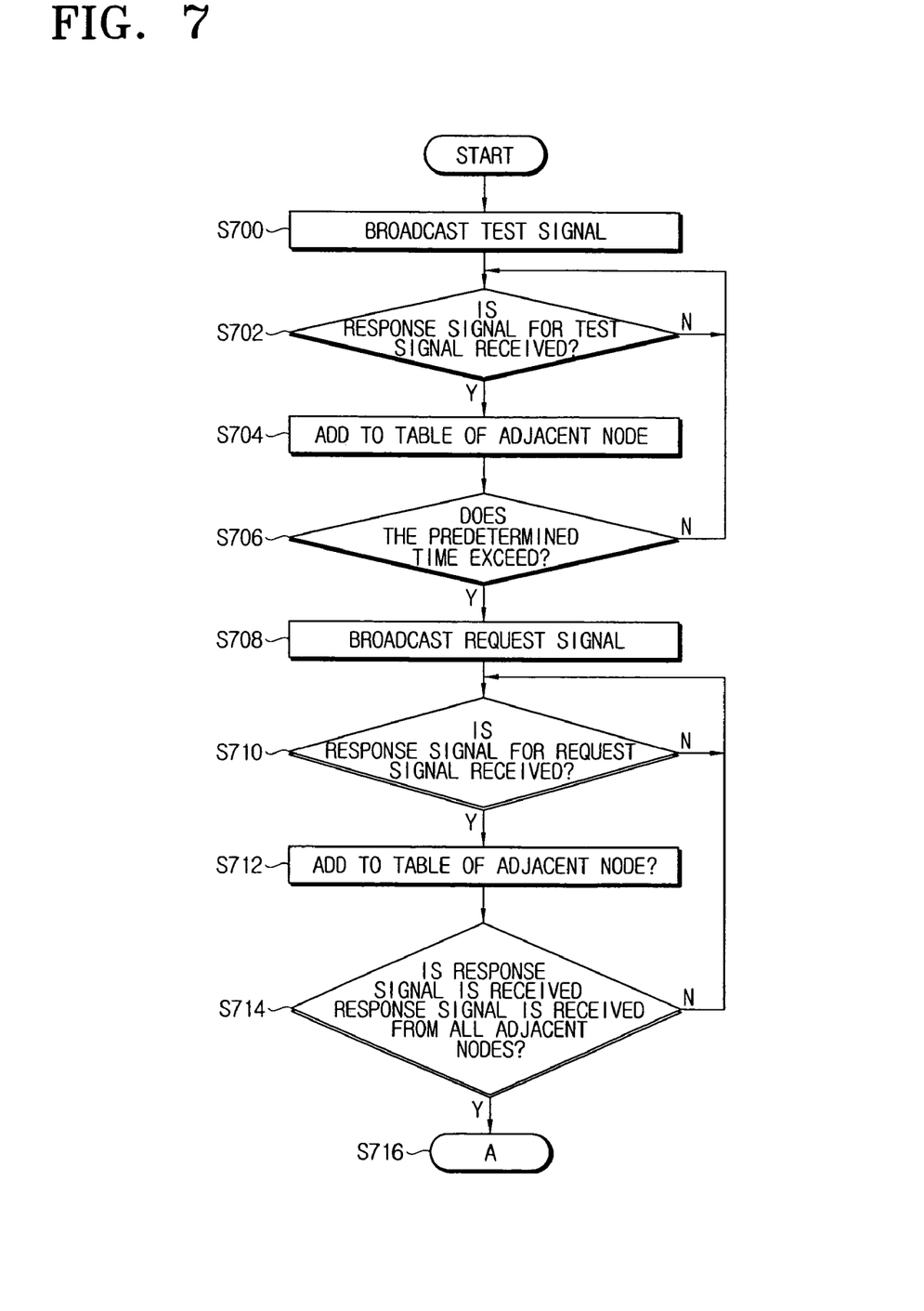
FIG. 7 is a flowchart illustrating exemplary steps of a node transmitting a test signal.

FIGS. 6 and 7 illustrate measurement of the power consumption between nodes in the data transmission. FIG. 6 illustrates exemplary operations of a node receiving a test signal, which is described below, and FIG. 7 illustrates exemplary operations of a node transmitting a test signal.

The node determines whether a test signal is received at step S600. The test signal is used to measure a power required for a node to transmit the collected data to an adjacent node. If the test signal is not received, the step S600 is repeated. If the test signal is received, the signal intensity measurer 414 of the node measures reception intensity of the test signal at step S602. Then, the node transmits the measured reception intensity to the node which transmits the test signal at step S604.

Referring now to FIG. 7, the node broadcasts a test signal at step S700. The node gradually increases an output intensity of the test signal at a predetermined time interval so as to measure the power consumption for the data transmission with all adjacent nodes. The adjacent nodes indicate nodes directly receiving the test signal. The node determines whether a response signal for the test signal is received from the adjacent nodes at step S702. If not, the step S702 is repeated until reception of the response signal.

If so, the node calculates the power consumptions for the data transmission with the adjacent nodes by use of information contained in the response signal at step S704. An exemplary table of adjacent nodes is shown in the following Table 1 as an example of power consumption.

TABLE 1

|       | u | adj 1 | adj 2 | ... | adj n |
|-------|---|-------|-------|-----|-------|
| u     | 0 | a     | b     | ... | c     |
| adj 1 | a | 0     | e     | ... | f     |
| adj 2 | b | e     | 0     | ... | g     |
| .     | . | .     | .     | ... | .     |
| .     | . | .     | .     | ... | .     |
| .     | . | .     | .     | ... | .     |
| adj n | c | f     | g     | ... | 0     |

In Table 1, 'u' represents the node transmitting the test signal, and 'adj 1' to 'adj n' represent the adjacent nodes transmitting the response signal for the test signal. As a result of the step S704, 'u' acquires 'a' to 'c' with respect to 'adj 1' to 'adj n', and the acquired information is organized into the table of the adjacent node.

'u' determines whether the predetermined time interval is exceeded at step S706. If not, the step S702 is repeated. If so, the reception of the response signal is aborted. 'u' broadcasts a request signal requesting information on the power consumption measured by the nodes with respect to the node transmitting the response signal at step S708. As aforementioned, all nodes located within a sensor field transmit the test signal and configure the table as shown in Table 1 based on responses for the test signal. Each node shares the acquired information with the other nodes. 'u' determines whether a response signal is received for the request signal at step S710. If not, the step S710 is repeated.

If so, 'u' organizes the table of the adjacent node by use of information contained in the received response signal at step S712. The information contained in the response signal received to 'u' is 'e', 'f', and 'g' as shown in Table 1. 'u' determines whether the response signal is received from all of the adjacent nodes at step S714. If so, the step S716 is performed, and if not, the step S710 is repeated.

In this exemplary embodiment of the present invention, not only the power consumption for the data transmission but also environmental effect is considered, as shown in FIGS. 6 and 7. That is, FIGS. 6 and 7 illustrate methods for measuring the substantial power consumption and utilizing the measured power. Hereinafter, descriptions are made on the power to be transmitted by each node using data on the measured power consumption.

Provided that a power of the signal transmitted by the start node is 10 mW and that of the signal received to a receiving node is 8 mW, the power consumption with respect to two nodes is calculated by the following Equation 1.

$$\text{Loss} = -10\log\frac{\text{receiption power}}{\text{transmission power}} \quad \text{[Equation 1]}$$

$$= -10\log(8/10) = 0.97 \text{ dB}$$

The receiving node needs to receive the data with a power greater than a threshold. Specifically, if the data is received with a power less than the threshold, the receiving node is unable to perform the required operations. The minimum power for the data transmission by the start node is obtained by the following Equation 2.

minimum transmission power=threshold power×
$10^{0.097}$ [Equation 2]

Hereinafter, the configuration of the minimum power characteristic graph is described using the table of the adjacent node, which is organized with reference to FIGS. 6 and 7.

Figure 8:
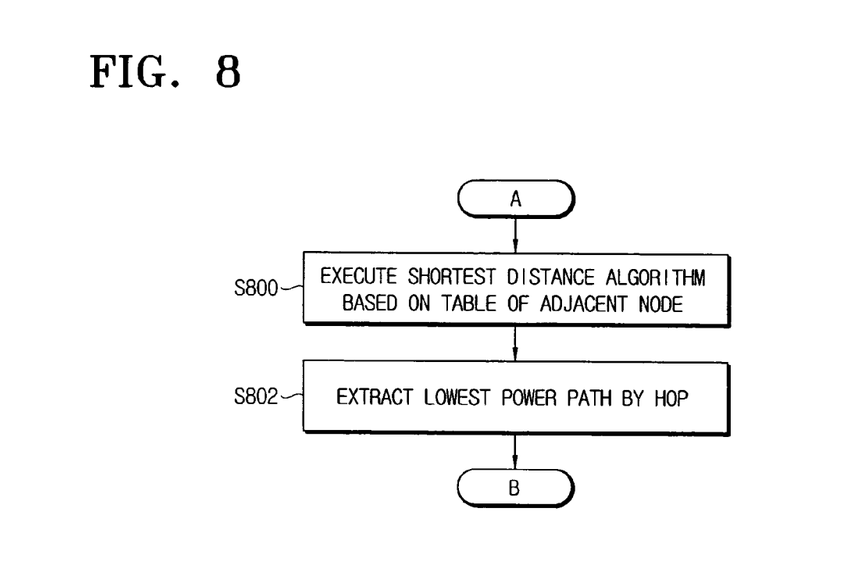
FIG. 8 is a flowchart illustrating exemplary steps for extracting a lowest power path.

FIG. 8 illustrates exemplary steps for configuring the minimum power characteristic graph according to an exemplary embodiment of the present invention. The node executes a shortest distance algorithm at step S800, to thus obtain a lowest power path, a power consumption of the lowest power path, and nodes forming the lowest power path. The node extracts the lowest power path by a hop at step S802.

Figure 9:
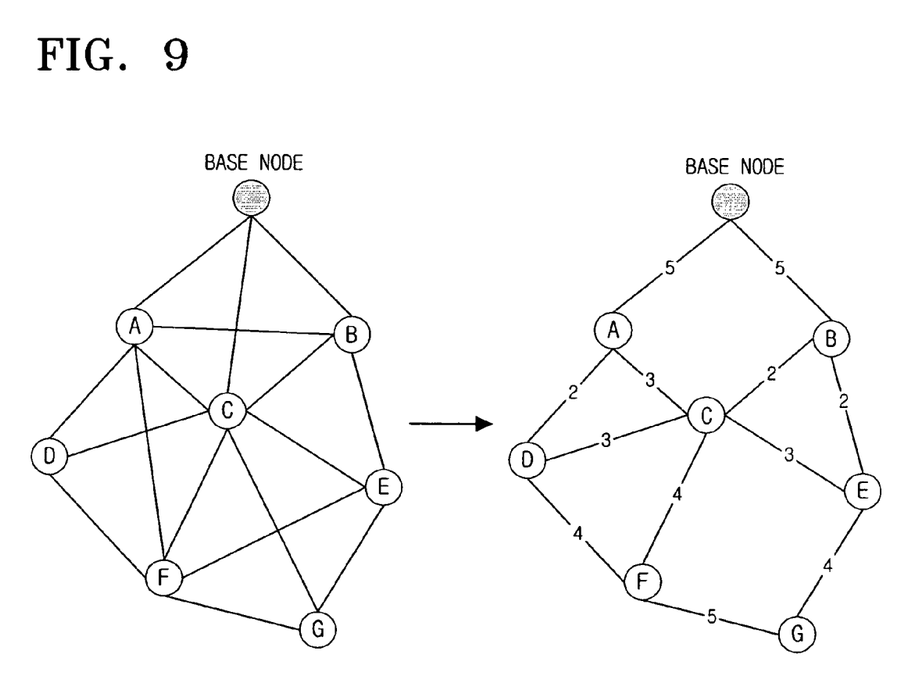
FIG. 9 is a diagram illustrating the lowest power paths between the nodes forming the ad-hoc sensor network.

FIG. 9 illustrates the lowest power path according to an exemplary embodiment of the present invention. A transmission path between nodes is called a hop. Referring now to FIG. 9, the lowest power path is obtained using the shortest distance algorithm.

If the node D, which sets the lowest power path for the node A, sets the lowest power path for the node F, the lowest power path from the node A to the node F is removed. That is, the node F transmits data to the node A via the node D, not directly to the node A.

Still referring to FIG. 9, descriptions are made on the configuration of the routing table of each node by use of a trigger message transmitted from the base node. When the base node transmits the trigger message, the nodes A and B receive the trigger message. The nodes A and B acquire and store necessary information using the received trigger message. The following Table 2 shows the information acquired by the node A.

TABLE 2

|                   | base node | node C | node D |
|-------------------|-----------|--------|--------|
| power consumption | 5         |        |        |
| hop count         | 1         |        |        |

In Table 2, the base node, the node C, and the node D are connected through the lowest power paths. The node B also stores such information as shown in Table 2. The hop count indicates the number of hops to the base node, and the power consumption indicates the power consumed for the data transmission to the base node. Then, the nodes A and B transmit the received trigger message to other nodes which are connected through the lowest power paths. Specifically, the node A transmits the trigger message to the nodes C and D, and the node B transmits the trigger message to the nodes C and E. The trigger message contains the information acquired by the nodes A and B. The nodes C, D, and E acquire and store necessary information using the received trigger message. The following Table 3 shows the information acquired by the node C.

TABLE 3

|                   | node A | node B | node D | node E | node F |
|-------------------|--------|--------|--------|--------|--------|
| Power consumption | 8      | 7      |        |        |        |
| hop count         | 2      | 2      |        |        |        |

Figure 10:
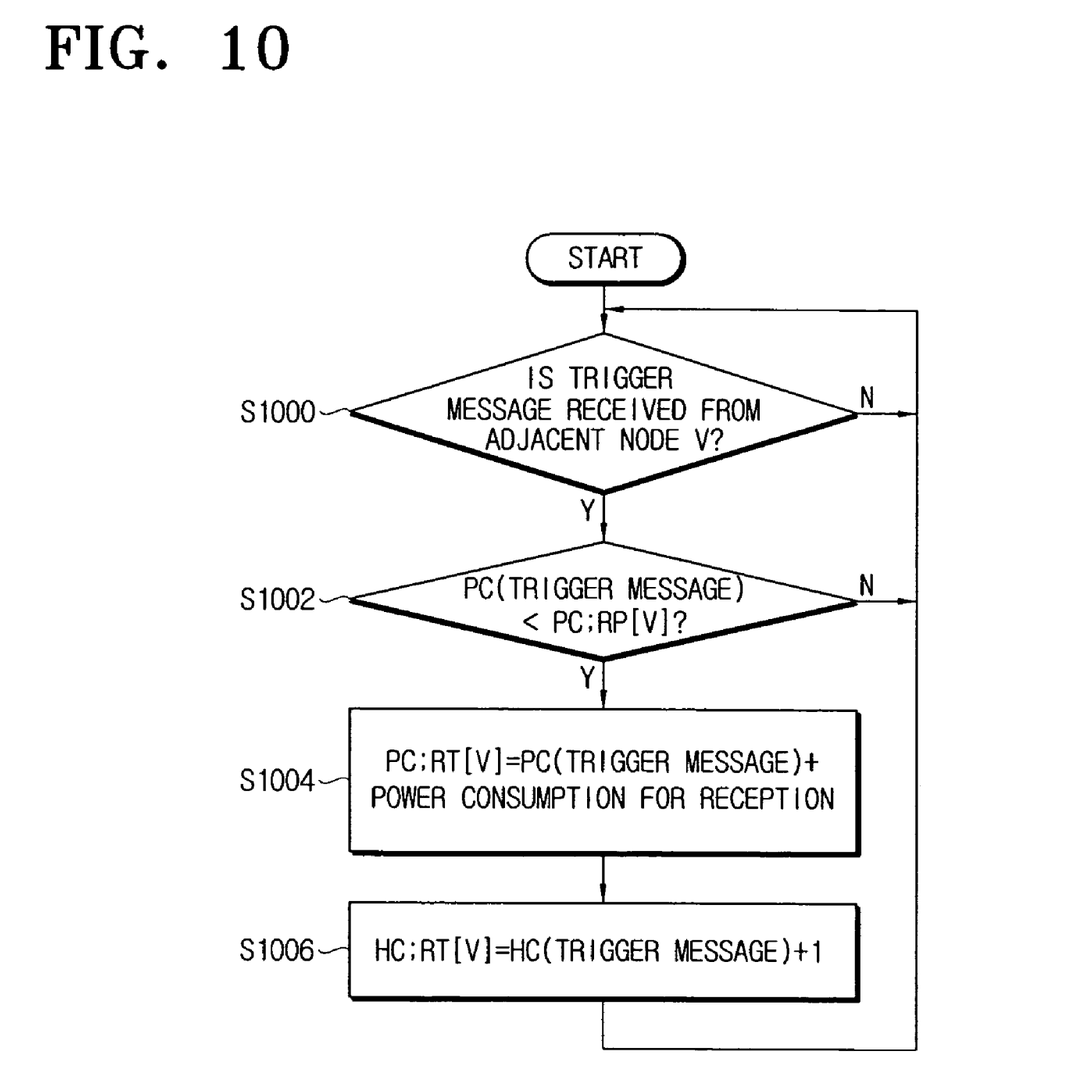
FIG. 10 is a flowchart illustrating exemplary steps for updating a routing table of the node.

FIG. 10 illustrates exemplary steps for updating the routing table of each node according to an exemplary embodiment of the present invention, which is described below in detail.

A node determines whether the trigger message is received from an adjacent node v at step S1000. If not, the step S1000 is repeated. If so, the node compares information on the power consumption PC;RT[v] of the adjacent node v stored in the existing routing table and that on the power consumption PC (trigger message) contained in the trigger message at step S1002.

When the power consumption PC (trigger message) is less than the power consumption PC;RT[v], the node adds the power consumption PC (trigger message) and a power required for the reception, and updates the existing routing table based on the calculation at step S1004. The node adds one to a hop count contained in the trigger message HC (trigger message) and updates the existing routing table based on the hop count calculation at step S1006. It should be appreciated that the steps S1004 through 1006 may be executed as a single step. The following Table 4 shows an example of the routing table.

TABLE 4

|  | first node | Second node | ... | n-th node |
|---|---|---|---|---|
| power consumption | L | M | ... | N |
| hop count | O | P | ... | Q |
| remaining energy | X | Y | ... | Z |

In Table 4, the node is connected with the first to n-th nodes through the lowest power paths and is aware of information on the remaining energy with respect to the connected first to n-th nodes. The information on the remaining energy is contained in and transmitted with the trigger message by the adjacent node. The power consumed by the first node along the path is 'L' and its hop count is 'O'. Hereinafter, descriptions are made on considerations in determining the path by use of the routing table.

A node configuring the routing table as shown in Table 3, transmits data received from an adjacent node or data to be transmitted using the routing table. The node can variably establish a path in consideration of importance of data to be transmitted. If the data needs to be promptly transmitted to the base node, the node compares the hop counts in the routing table and forwards the data to a node having the smallest hop count. In general, data transmission time is in direct proportion to the hop count. Hence, it is most suitable to use the path having the smallest hop count. If the data does not need prompt transmission, the node compares the power consumptions in the routing table. As a result of the comparison, the node transmits the data using the path having the smallest power consumption. Consequently, the power consumed by the nodes can be minimized. That is, the data is transmitted along the path depending on the importance (required promptness of transmission) of the data.

Figure 11:
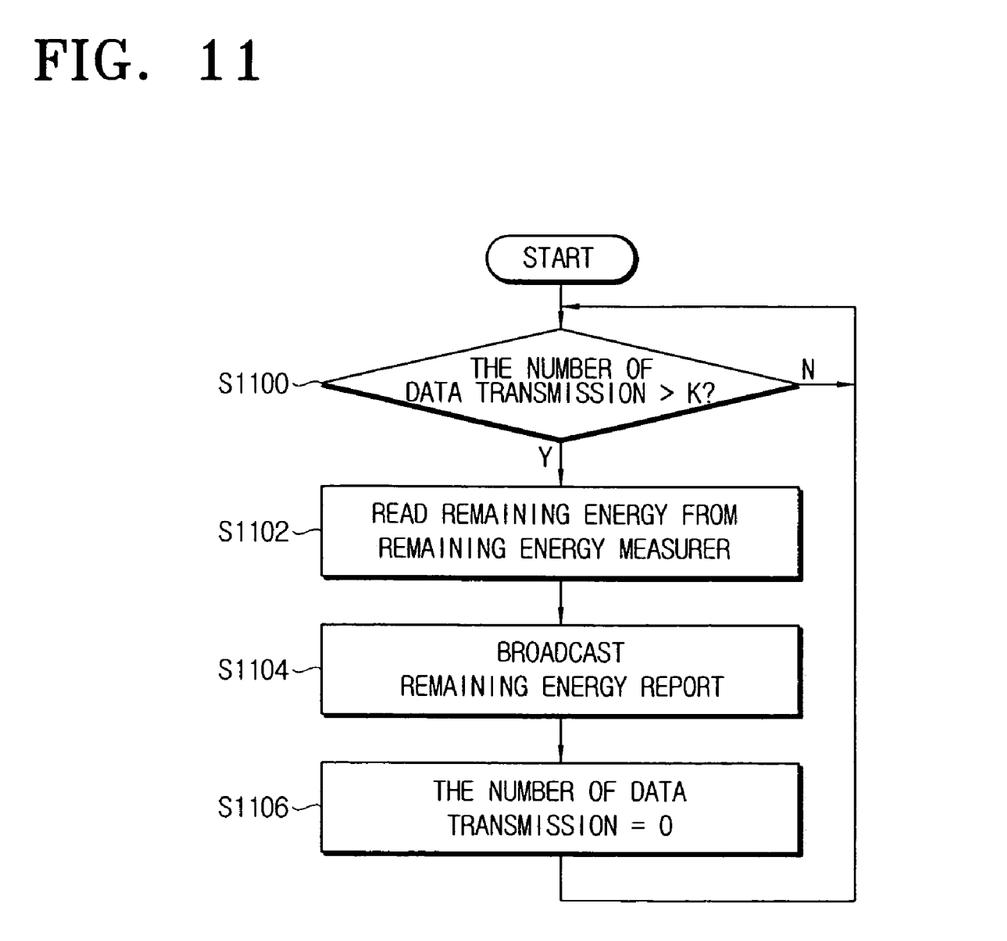
FIG. 11 is a flowchart illustrating exemplary steps for broadcasting information on the remaining energy from the node.

FIG. 11 illustrates exemplary steps for minimizing the power consumption when a certain node is used as a relay node. Referring back to FIG. 9, the node C transmits data to the node B to minimize the power consumption. The node B performs operations for forwarding the received data to the base node. The node B consumes the power for forwarding the received data to the base node, to thus considerably decrease the remaining energy of the node B. Accordingly, it is required to minimize the power consumption of the node B.

Referring now to FIG. 11, a node counts the number of the data transmission and compares the number of the data transmission with a predetermined value k at step S1100. If the number of the data transmission is equal to or less than the predetermined value k, the step S1100 is repeated. If the number of the data transmission is greater than the predetermined value k, the node reads the remaining energy from the remaining energy measurer 408 at step S1102. The node broadcasts the read remaining energy to the adjacent nodes at step S1104. The number of the data transmission is set to '0' at step S1106 and the step S1100 is repeated.

Figure 12:
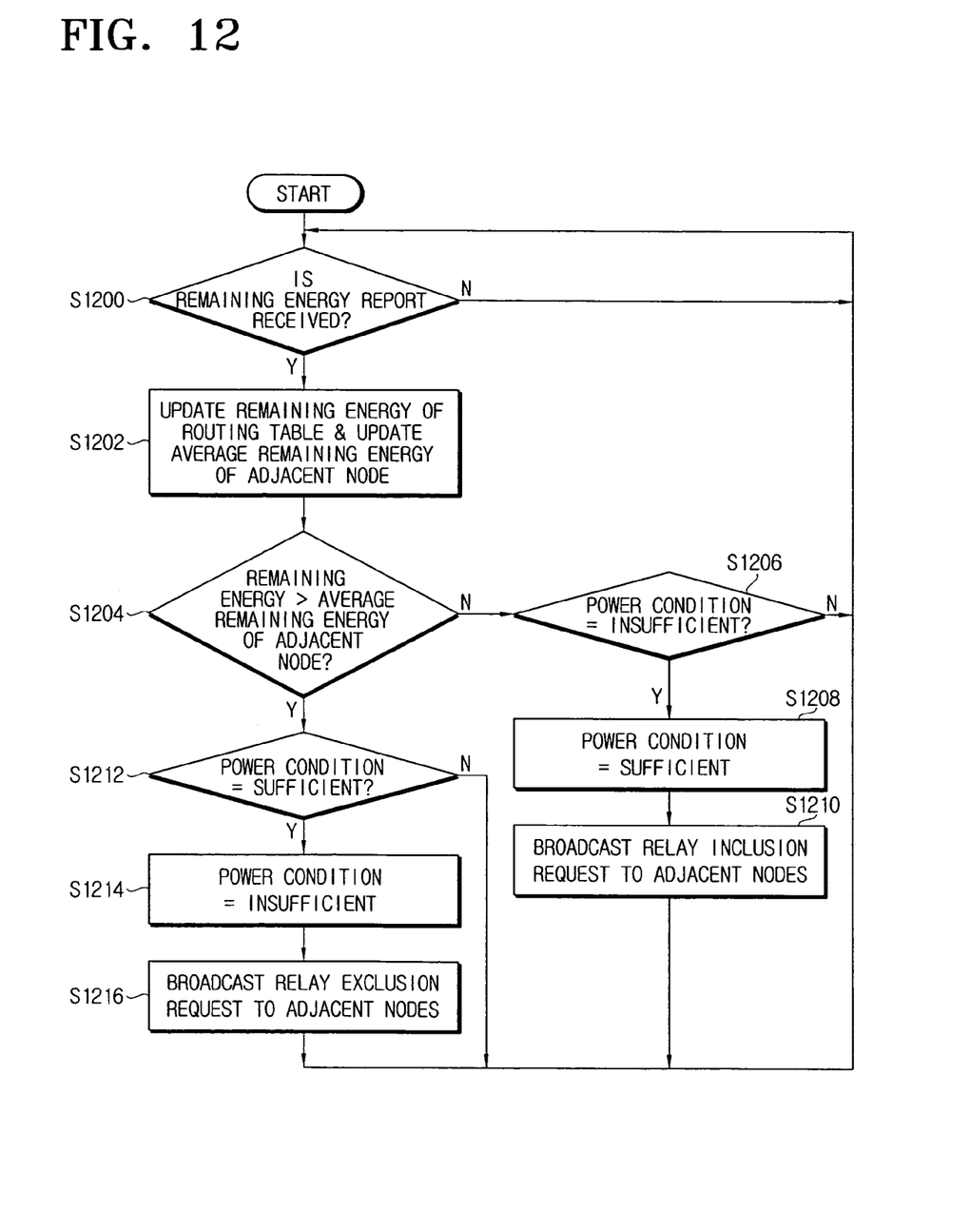
FIG. 12 is a flowchart illustrating exemplary steps of a node receiving the information on the remaining energy.

FIG. 12 illustrates exemplary steps of the node being notified of the remaining energy. The node determines whether the remaining energy is reported at step S1200. If not, the step S1200 is repeated. If so, the node updates the routing table using the received remaining energy and an average remaining energy based on the received remaining energy and the routing table at step S1202. The node compares the received remaining energy and the average remaining energy at step S1204.

If the remaining energy is equal to or greater than the average remaining energy, the node checks the power condition before the update with respect to the node notifying the remaining power at step S1206. If the power is 'sufficient', the step S1200 is repeated. If the power is 'insufficient', the node changes the power condition to 'sufficient' with respect to the node notifying the remaining energy at step S1208, and broadcasts a relay inclusion request to the adjacent nodes at step S1210. The node having the 'sufficient' power traits its own data as well as the data received from the adjacent nodes. The node of the 'insufficient' power transmits its own data alone.

If the remaining energy is less than the average remaining energy, the node checks the power condition before the update with respect to the node notifying the remaining power at step S1212. If the power is 'insufficient' the step S1200 is repeated. If the power is 'sufficient', the node changes the power condition to 'insufficient' with respect to the node notifying the remaining energy at step S1214, and notifies the adjacent nodes of a relay exclusion request at step S1216.

Referring back to FIG. 9, if the node C uses the node B as the relay node for a predetermined time and the remaining energy of the node B is less than the average remaining energy, the node C broadcasts a relay exclusion request message to the adjacent nodes. If the remaining energy of the node A is greater than the average remaining energy, the node C broadcasts a relay inclusion request message to the adjacent nodes.

Still referring to FIG. 9, descriptions are made on the transmission of the relay inclusion request message to the adjacent nodes. When the node C requests the relay inclusion with respect to the node A, the node C determines whether to transmit data via the node A. Referring to Table 3, when the data is transmitted via the node A, the power consumption is 8. The node C compares the power consumption 8 with a power consumed when data is transmitted via nodes for which the relay exclusion is not requested.

The node C transmits the data to the base node using the node A or the node B as the relay node. The node C compares the power consumptions in case of using the node A and the node B. Depending on the comparison, the node C sets as the relay node the node having the smaller power consumption. If the two power consumptions are the same, the node C sets as the relay node a newly-joined node.

The above descriptions are made on the usage of the minimum power for the routing, but the hop count may be compared so as to reduce the delay time. That is, as a result of the comparison of the hop count, the node having the smallest hop count can be set as a new relay node.

Still referring to FIG. 9, the transmission of the relay exclusion request message to the adjacent nodes is described in greater detail. When the relay exclusion request message for the node B is broadcast, the node C excludes the node B and establishes an optimal path using the routing table. The path via the node A is established as shown in FIG. 9.

Hereinbelow, the mobility of the node, which is the consideration for configuring the routing table, is described in detail. If the node moves within or out of the sensor field, the movement of the node has to be promptly reflected to the routing table, to thus utilize the minimum power in the data transmission. According to an exemplary embodiment of the present invention, when a node moves, the node broadcasts to adjacent nodes data on the movement. Concretely, when the node moves out of its original location, the moving node broadcasts to adjacent nodes data on the movement. When a new node joins, data on the new node is broadcast to adjacent nodes. If a certain node is disconnected, the adjacent nodes configure a new minimum power characteristic graph and update the routing table using the new minimum power characteristic graph.

Sudden node errors, for example, damages or power exhaustion, are dealt with similarly as in the node movement. It is essential in multihop that a certain node relay data of other nodes. Accordingly, if sudden errors occur to a particular node, the particular node is considered to be out of the sensor field and is excluded from the routing table. With the particular node being excluded, the routing table is updated and the path is established using the updated routing table.

In light of the foregoing, the start node transmits data to the base node using the lowest power path, to thus minimize the power consumption. Data transmission efficiency rises since data is classified into one requiring the prompt transmission and the other not requiring the prompt transmission. Changes or movements of the node in the sensor field are notified to the adjacent nodes with no delay so that the changes or the movements of the node are reflected to the routing table. The node having insufficient remaining energy is excluded from the relay node so as to maintain the power consumptions of all nodes in the sensor field to a similar level.

While the exemplary embodiments of the present invention have been described, additional variations and modifications of the exemplary embodiments may occur to those skilled in the art once they learn of the basic inventive concepts. Therefore, it is intended that the appended claims shall be construed to include both the above exemplary embodiments and all such variations and modifications that fall within the spirit and scope of the invention.

What is claimed is:

1. In a communicating system comprising a base node, at least one adjacent node, and a start node transmitting data requested by the base node via the adjacent node or to the base node, a method for transmitting data requested to the start node comprising:
   measuring a power required for data transmission between the nodes forming the communication system;
   selecting a path depending on a minimum power consumption required for the data transmission from the base node to the start node using the measured power; and
   transmitting the requested data using the selected path,
   wherein the start node stores paths capable of transmitting the requested data, a power consumption in transmitting the data along the paths, and an information on a number of adjacent nodes relaying the data,
   wherein the start node is notified of an information on a remaining energy from the adjacent nodes when a number of data transmissions of the adjacent nodes is greater than a predetermined value, and
   wherein the requested data is transmitted using the path having the smallest number of the relaying adjacent nodes when a prompt transmission of the data is required.

2. The method of claim 1, wherein the requested data is transmitted using another path when the remaining energy of the relaying adjacent nodes is less than a threshold.

3. The method of claim 2, wherein the requested data is transmitted using a path comprising adjacent nodes having the remaining energy greater than the threshold.

4. The method of claim 1, wherein the start node deletes an information on a node incapable of relaying the data.

5. The method of claim 1, wherein an adjacent node of which a location is changed notifies the other nodes of the communication system of an information on the location change.

6. The method of claim 5, wherein paths capable of transmitting the requested data, the power consumption in transmitting the data along the paths, and the information on the number of relaying adjacent nodes are updated based on the changed location information.

7. The method of claim 1, wherein the path is selected one hop at a time.

8. In a communicating system comprising a base node, at least one adjacent node, a start node transmitting data requested by the base node via the adjacent node or to the base node, a system for transmitting data requested to the start node comprising:
   the base node; and
   the start node selecting a path depending on a minimum power consumption required for the data transmission from the base node using a measured power consumption of each node, and transmitting the requested data using the selected path,
   wherein the start node stores paths capable of transmitting the requested data, a power consumption in transmitting the data along the paths, and an information on a number of adjacent nodes relaying the data,
   wherein the start node is notified of an information on a remaining energy from the adjacent nodes when a number of data transmissions of the adjacent nodes is greater than a predetermined value, and
   wherein the start node transmits the requested data using the path having the smallest number of the relaying adjacent nodes when a prompt transmission of the data is required.

9. The system of claim 8, wherein the start node transmits the requested data using another path when the remaining energy of the relaying adjacent nodes is less than a threshold.

10. The system of claim 9, wherein the threshold is an average of the remaining energy of the nodes capable of relaying the data.

11. The system of claim 9, wherein the start node transmits the requested data using a path comprising adjacent nodes having the remaining energy greater than the threshold.

12. The system of claim 8, wherein the start node deletes an information on an adjacent node incapable of relaying the data.

13. The system of claim 8, wherein an adjacent node of which a location is changed notifies the other nodes of the communication system of an information on the location change.

14. The system of claim 13, wherein the start node updates paths capable of transmitting the requested data, the power consumption in transmitting the data along the paths, and the information on the number of relaying adjacent nodes based on the changed location information.

15. The system of claim 8, wherein the path is selected one hop at a time.

* * * * *